United States Patent
Li

(10) Patent No.: US 9,088,603 B2
(45) Date of Patent: Jul. 21, 2015

(54) FILE TRANSFER METHOD AND DEVICE

(71) Applicant: Huawei Technologies Co., LTD, Shenzhen (CN)

(72) Inventor: Chunmao Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 13/933,016

(22) Filed: Jul. 1, 2013

(65) Prior Publication Data

US 2013/0291104 A1  Oct. 31, 2013

Related U.S. Application Data

(63) Continuation of application No. PCT/CN2012/077646, filed on Jun. 27, 2012.

(30) Foreign Application Priority Data

Jun. 27, 2011 (CN) .......................... 2011 1 0174458

(51) Int. Cl.
G06F 12/14 (2006.01)
H04L 29/06 (2006.01)
H04L 29/08 (2006.01)
H04L 12/58 (2006.01)

(52) U.S. Cl.
CPC ............ *H04L 63/1416* (2013.01); *H04L 51/12* (2013.01); *H04L 63/0245* (2013.01); *H04L 63/1425* (2013.01); *H04L 67/06* (2013.01); *H04L 67/145* (2013.01); *H04L 67/2842* (2013.01); *H04L 63/0281* (2013.01)

(58) Field of Classification Search
None
See application file for complete search history.

(56) References Cited

U.S. PATENT DOCUMENTS

| | | | |
|---|---|---|---|
| 5,623,600 | A | 4/1997 | Ji et al. |
| 7,577,749 | B1 | 8/2009 | Long |
| 7,734,790 | B1 | 6/2010 | Chen |
| 7,764,790 | B2 | 7/2010 | Ryan |
| 2007/0169184 | A1 | 7/2007 | Krywaniuk |
| 2008/0228772 | A1* | 9/2008 | Plamondon ..................... 707/10 |
| 2010/0325357 | A1* | 12/2010 | Reddy et al. .................. 711/118 |

FOREIGN PATENT DOCUMENTS

| | | |
|---|---|---|
| CN | 1571330 A | 1/2005 |
| CN | 101009704 A | 8/2007 |
| CN | 101159739 A | 4/2008 |
| CN | 102006675 A | 4/2011 |
| CN | 102209039 A | 10/2011 |

OTHER PUBLICATIONS

Extended European Search Report received in Application No. 12805171.1-1862 mailed May 14, 2014, 7 pages.

(Continued)

*Primary Examiner* — Brandon Hoffman
(74) *Attorney, Agent, or Firm* — Slater & Matsil, L.L.P.

(57) ABSTRACT

Embodiments of the present invention provide a file transfer method. A file is received and cached from a sending device. At least one data packet is sent to a receiving device at a preset interval to maintain a data connection between the sending device and the receiving device. The file is detected after the file is cached to determine whether the file has a security risk. The cached file is sent to the receiving device if the file has no security risk.

18 Claims, 3 Drawing Sheets

(56) References Cited

OTHER PUBLICATIONS

Second Chinese Office Action received in Application No. 201110174458.5, mailed Feb. 20, 2014, 4 pages.
International Search Report received in Application No. PCT/CN2012/077646 mailed Oct. 18, 2012, 13 pages.
Chinese Search Report received in Application No. 2011101744585 mailed Jun. 14, 2013, 2 pages.
First Office Action of Chinese Application No. 201110174458.5 mailed Jun. 24, 2013, 8 pages. (Partial Translation).

* cited by examiner

FILE TRANSFER METHOD AND DEVICE

CROSS-REFERENCE TO RELATED APPLICATIONS

This application is a continuation application of International patent application No. PCT/CN2012/077646, filed Jun. 27, 2012, which claims priority to Chinese Patent Application No. 201110174458.5, filed with the Chinese Patent Office on Jun. 27, 2011, both of which are herein incorporated by reference in its entirety.

TECHNICAL FIELD

The present invention relates to the field of communications, and in particular, to a file transfer method and device.

BACKGROUND

Currently, when a network firewall performs security scanning on a file that is downloaded by using the HTTP (Hypertext transfer protocol) protocol, a full proxy technology is generally applied. The whole file is downloaded to the firewall first, and the file is returned to a user that downloads the file, only when it is detected that the file is secure. It is the same as file uploading. The firewall saves a file first, detects the file, and uploads the file to a destination server only after it is detected that the file is secure.

In the prior art, when a network is restricted, it may take a long time to download a file with a large data amount from a server to a firewall. Consequently, a download client receives no data within a long period of time, and therefore, the client may consider a connection broken and then close the connection automatically, which causes a download failure. Similarly, it also takes a long time to upload a file with a large data amount from a client to a file server. As a result, the server usually receives no data within a long period of time, and therefore, the server may close a connection automatically, which causes that file transfer fails.

SUMMARY OF THE INVENTION

Embodiments of the present invention provide receiving device.

A file transfer method includes: receiving and caching a file from a sending device; sending at least one data packet to a receiving device at a preset interval, to maintain a data connection between the sending device and the receiving device; detecting the file after the file is cached, to detect whether the file has a security risk; and sending the cached file to the receiving device if the file has no security risk.

Another embodiment of the present invention provides a file transfer device includes a receiving module, configured to receive and cache a file from a sending device; a connection maintaining module, configured to send at least one data packet to a receiving device at a preset interval, to maintain a data connection between the sending device and the receiving device; a detecting module, configured to detect the file after the file is cached, to detect whether the file has a security risk, and a sending module, configured to send the cached file to the receiving device if the file has no security risk.

By using the file transfer method and device provided in the embodiments of the present invention, a file from a sending device is received and cached, and at least one data packet is sent to a receiving device at a preset interval to maintain a data connection between the sending device and the receiving device. The file is detected after the file is cached, to detect whether the file has a security risk. If the file has no security risk, the cached file is sent to the receiving device. In this way, the case where the data connection is broken when the receiving device receives no data message within a long period of time is avoided, and the success rate of file transfer is improved.

BRIEF DESCRIPTION OF THE DRAWINGS

To illustrate the technical solutions in the embodiments of the present invention or in the prior art more clearly, the accompanying drawings required for describing the embodiments or the prior art are introduced briefly in the following. Apparently, the accompanying drawings in the following description merely show some embodiments of the present invention, and persons of ordinary skill in the art may still derive other drawings from these accompanying drawings without creative efforts.

DETAILED DESCRIPTION OF ILLUSTRATIVE EMBODIMENTS

To make the solutions of the present invention more comprehensible for persons skilled in the art, the technical solutions in the embodiments of the present invention are described clearly and completely in the following with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
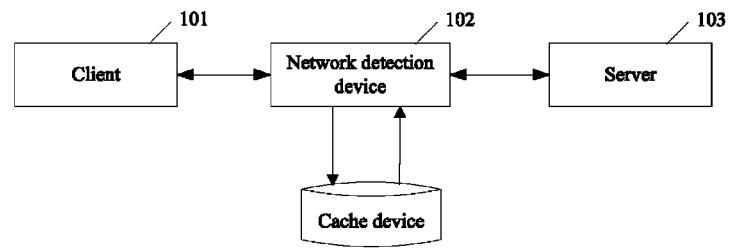
FIG. 1 is an application scenario diagram of a file transfer method according to an embodiment of the present invention.

FIG. 1 shows an application scenario according to an embodiment of the present invention. A client 101, a network detection device 102, a server 103, and a cache device are included. The client is configured to upload a file to the server 103 or download a file from the server 103. The network detection device is configured to detect a file and the cache device is configured to cache a file to be detected.

Figure 2:
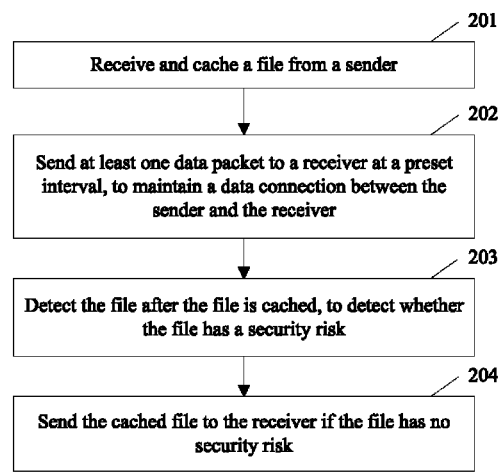
FIG. 2 is a flowchart of a file transfer method according to an embodiment of the present invention.

This first embodiment (Embodiment 1) of the present invention provides a file transfer method. The technical solution of the present invention is described in the following by taking a scenario where the client 101 downloads a file from the server 103 as an example. The network detection device 102 caches and detects a downloaded file. As shown in FIG. 2, the method includes the following steps.

Step 201: Receive and cache a file from a sending device.

Step 202: Send at least one data packet to a receiving device at a preset interval, to maintain a data connection between the sending device and the receiving device.

Step 203: Detect the file after the file is cached, to detect whether the file has a security risk.

Step 204: Send the cached file to the receiving device if the file has no security risk.

By using the file transfer method and device provided in this embodiment of the present invention, a file from a sending device is received and cached, and at least one data packet is sent to a receiving device at a preset interval to maintain a data connection between the sending device and the receiving device. The file is detected after the file is cached, to detect whether the file has a security risk. If the file has no security risk, the cached file is sent to the receiving device. In this way, a case where the data connection is broken when the receiving device receives no data message within a long period of time is avoided, and a success rate of file transfer is improved.

In step 201, the network detection device 102 may receive a file from the client 101 or a file from the server 103. In this embodiment, only a case where a file from the server 103 is received is described. A case where a file from the client 101 is received is similar, and is not described herein again.

Step 202 may specifically include sending at least one data packet to the receiving device at a preset interval, where an HTTP header of the data packet is the same as an HTTP header of a data packet in the file, for example, an HTTP packet may be constructed, and a header parameter of the data packet is the same as a header parameter of the data packet in the file. In this way, an effective connection can be maintained, or sending at least one cached file data packet to the receiving device at a preset interval, for example, sending a few data packets to the receiving device, or for example, sending one file data packet to the receiving device every two seconds.

By using the method in step 202, a data packet is sent to the receiving device periodically to maintain a connection between the receiving device and the sending device, thereby effectively preventing file loss caused by a broken connection due to timeout.

Step 203 may specifically include detecting the file after the file is cached, to detect whether the file has a security risk.

In step 204, if a connection maintaining manner applied in step 202 is to send at least one cached file data packet to the receiving device at a preset interval. Correspondingly, step 204 is: sending to the receiving device the file that is cached and is not sent if the file has no security risk.

Step 204 may further include discarding the cached file and breaking the data connection between the sending device and the receiving device if the file has a security risk.

Figure 3:
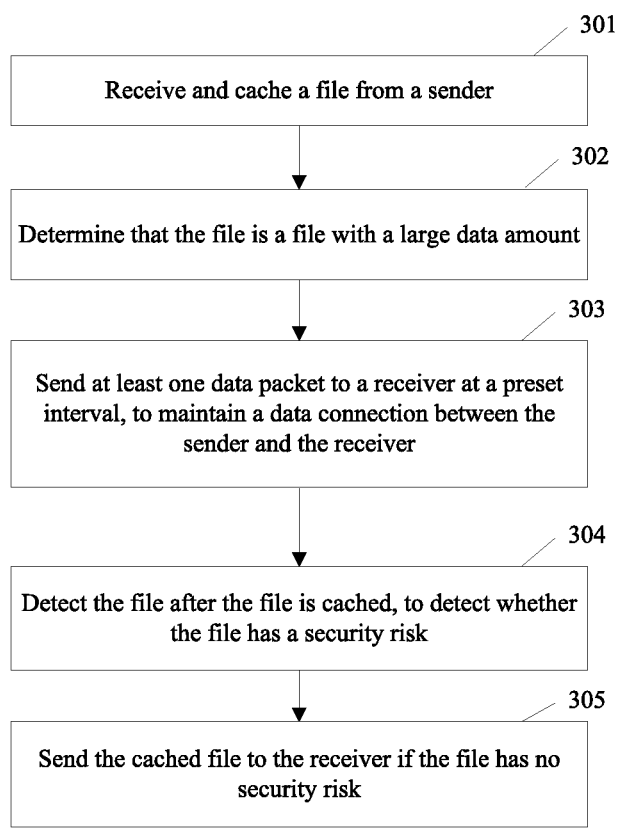
FIG. 3 is a flowchart of another file transfer method according to an embodiment of the present invention.

This second embodiment (Embodiment 2) of the present invention provides another storage method that is based on data content identification. As shown in FIG. 3, the method includes the following steps.

Step 301: Receive and cache a file from a sending device.

Step 302: Determine that the file is a file with a large data amount.

Step 303: Send at least one data packet to a receiving device at a preset interval, to maintain a data connection between the sending device and the receiving device.

Step 304: Detect the file after the file is cached, to detect whether the file has a security risk.

Step 305: Send the cached file to the receiving device if the file has no security risk.

Step 301, step 303, step 304, and step 305 in this embodiment are similar to step 201, step 202, step 203, and step 204 in Embodiment 1, and are not described herein again.

In step 302, a connection maintaining method is initiated only when it is determined that the file is a file with a large data amount. A file with a small data amount may be processed in a conventional way, thereby reducing a processing load and saving a system resource.

Specifically, step 302 may further include detecting that a data amount of the received file exceeds a first threshold. Alternatively the detection can occur when time for caching the received file exceeds a second threshold. A data amount of a file may be determined according to time for caching the file or according to a size of a cached file directly. For example, in a process of caching the file, when it is found that a cached data amount exceeds the first threshold or when it is found that time for caching the file exceeds the second threshold, it is determined that the received file is a large file and connection maintaining processing needs to be initiated, that is, step 303 needs to be performed.

Figure 4:
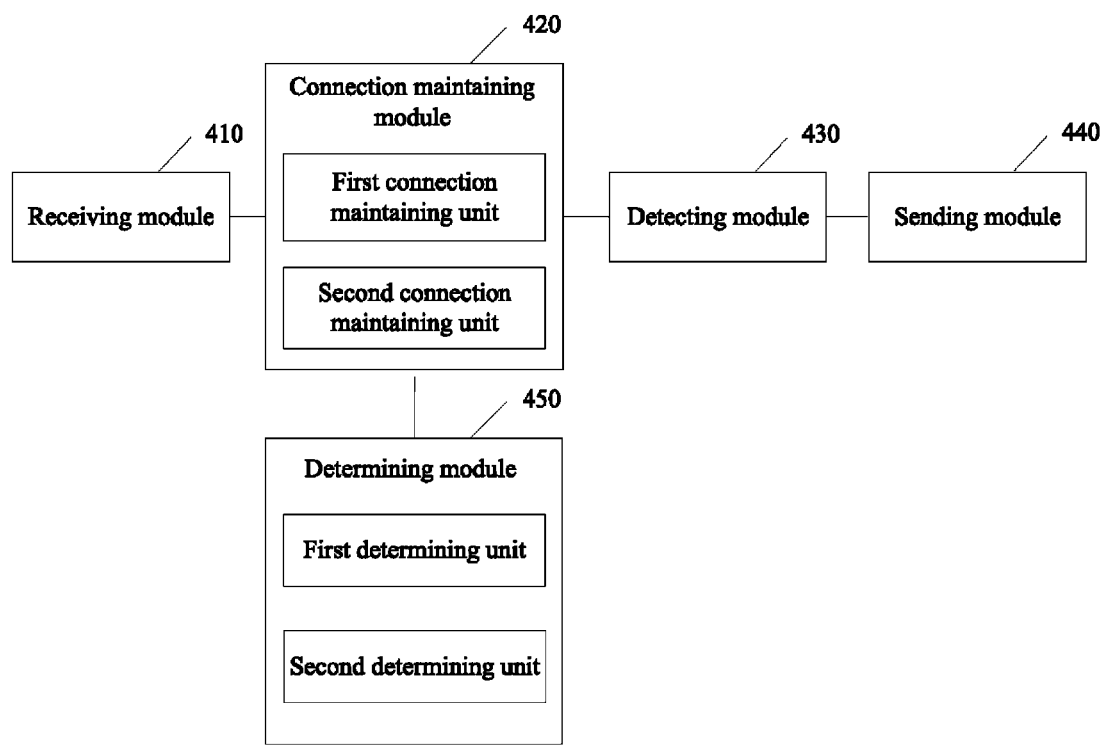
FIG. 4 is a schematic diagram of a file transfer device according to an embodiment of the present invention.

This third embodiment (Embodiment 3) of the present invention provides a file transfer device. As shown in FIG. 4, the transfer device includes a receiving module 410, which is configured to receive and cache a file from a sending device. A connection maintaining module 420 is configured to send at least one data packet to a receiving device at a preset interval to maintain a data connection between the sending device and the receiving device. A detecting module 430 is configured to detect the file after the file is cached and to detect whether the file has a security risk. A sending module 440 is configured to send the cached file to the receiving device if the file has no security risk.

In this embodiment, the file transfer device further includes a determining module 450, which is configured to, before the connection maintaining module sends at least one data packet to the receiving device at a preset interval, determine that the file is a file with a large data amount.

The determining module includes a first determining unit 451. That is configured to determine that a data amount of the received file exceeds a first threshold. Alternatively, or in addition, a second determining unit 452 can be configured to determine that time for transferring the received file exceeds a second threshold.

The connection maintaining module 420 includes a first connection maintaining unit 421, which is configured to send at least one data packet to the receiving device at a preset interval. An HTTP header of the data packet is the same as an HTTP header of a data packet in the file. A second connection maintaining unit 422 can also, or alternatively, be configured to send at least one cached file data packet to the receiving device at a preset interval.

The sending module 440 is further configured to send a remaining unsent file data packet to the receiving device.

Through the description of the preceding embodiments, persons skilled in the art may clearly understand that the present invention may be implemented by software plus a necessary hardware platform, and definitely may also be implemented by hardware, but in most cases, the former is a preferred implementation manner. Based on such understanding, all or a part of the technical solutions of the present invention, which contributes to the prior art, may be embodied in the form of a software product. The computer software product may be stored in a storage medium such as a ROM/RAM, a magnetic disk, or an optical disk, and includes several instructions for instructing a computer device (which may be a personal computer, a server, a network device, and the like) to execute the methods described in all or a part of the embodiments of the present invention.

The present invention is described in detail in the preceding. Several examples are used for illustration of the principle and implementation manner of the present invention. The description of the preceding embodiments is only used to help understand the method and its core ideas in the present invention. Meanwhile, those skilled in the art can make variations to the specific implementation manner and application scope according to the ideas of the present invention. In conclusion, the content of this specification should not be construed as a limitation to the present invention.

What is claimed is:

1. A method, executed by a cache device, for transferring files between a sending device and a receiving device, the method comprising:
- receiving and caching a file from the sending device;
- determining that a size of the file exceeds a preset size threshold;
- based upon the determining and while the file is being received and cached, sending at least one data packet to the receiving device at a preset interval to maintain a data connection between the sending device and the receiving device;
- after the file is received and cached, determining that the cached file has no security risk; and
- based upon the determining, sending the cached file to the receiving device.

2. The method according to claim 1, wherein determining that the size of the file exceeds the preset size threshold comprises detecting that a time for caching the received file exceeds a preset time threshold.

3. The method according to claim 1, wherein sending the at least one data packet comprises sending the at least one data packet to the receiving device at the preset interval, wherein the at least one data packet has an HTTP header which is the same as an HTTP header of a data packet in the file.

4. The method according to claim 3, wherein when the at least one data packet of the cached file is sent to the receiving device at the preset interval, sending the cached file to the receiving device comprises sending data packets of the remaining file data packet to the receiving device.

5. The method according to claim 1, wherein sending at least one data packet comprises sending the at least one data packet of the cached file to the receiving at the preset interval.

6. The method according to claim 5, wherein when the at least one data packet of the cached file is sent to the receiving device at the preset interval, the sending the cached file to the receiving device comprises sending data packets of the remaining file data packet to the receiving device.

7. A file transfer device, comprising:
- a receiving module, configured to receive and cache a file from a sending device;
- a determining module, configured to determine that a size of the file exceeds a preset size threshold;
- a connection maintaining module, configured to, based upon the determining and while the file is being received and cached, send at least one data packet to a receiving device at a preset interval in order to maintain a data connection between the sending device and the receiving device;
- a detecting module, configured to check the cached file to detect whether the file has a security risk; and
- a sending module, configured to send the cached file to the receiving device if the file has no security risk.

8. The file transfer device according to claim 7, wherein the determining module determines that the size of the file exceeds the preset size threshold by determining that a time for transferring the received file exceeds a preset time threshold.

9. The file transfer device according to claim 7, wherein the connection maintaining module comprises a connection maintaining unit, configured to send at least one data packet to the receiving device at a preset interval, wherein an HTTP header of the data packet is the same as an HTTP header of a data packet in the file.

10. The file transfer device according to claim 9, wherein the sending module is further configured to send a remaining unsent file data packet to the receiving device.

11. The file transfer device according to claim 7, wherein the connection maintaining module comprises a connection maintaining unit, configured to send at least one cached file data packet to the receiving device at a preset interval.

12. The file transfer device according to claim 11, wherein the sending module is further configured to send a remaining unsent file data packet to the receiving device.

13. A device comprising:
- a processor; and
- a computer-readable storage medium storing a program to be executed by the processor, the program including instructions for:
  - receiving and caching a file from a sending device;
  - determining that a size of the file exceeds a preset size threshold;
  - based upon the determining, while the file is being received and cached, sending at least one data packet to a receiving device at a preset interval to maintain a data connection between the sending device and the receiving device;
  - after the file is received and cached, determining that the cached file has no security risk; and
  - based upon the determining, sending the cached file to the receiving device.

14. The device according to claim 13, wherein determining that the size of the file exceeds the preset size threshold comprises detecting that a time for caching the received file exceeds a preset time threshold.

15. The device according to claim 13, wherein sending the at least one data packet comprises sending the at least one data packet to the receiving device at the preset interval, wherein the at least one data packet has an HTTP header which is the same as an HTTP header of a data packet in the file.

16. The device according to claim 15, wherein, when the at least one data packet of the cached file is sent to the receiving device at the preset interval, sending the cached file to the receiving device comprises sending data packets of the remaining file data packet to the receiving device.

17. The device according to claim 13, wherein sending the at least one data packet comprises sending the at least one data packet of the cached file to the receiving at the preset interval.

18. The device according to claim 17, wherein, when the at least one data packet of the cached file is sent to the receiving device at the preset interval, sending the cached file to the receiving device comprises sending data packets of the remaining file data packet to the receiving device.

* * * * *